Figure 1:
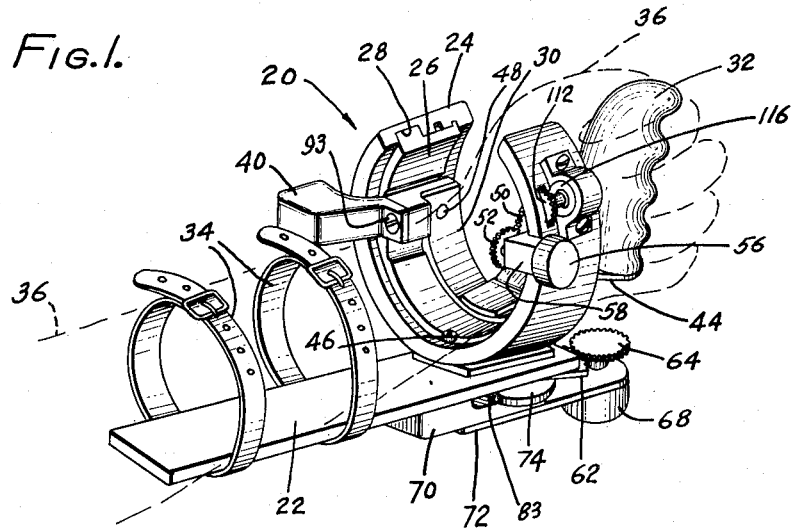

April 3, 1962

E. C. HOLLEMAN 3,028,126

THREE AXIS CONTROLLER

Filed May 10, 1960

4 Sheets-Sheet 1

INVENTOR.
EUCLID C. HOLLEMAN
BY

ATTORNEYS

April 3, 1962  E. C. HOLLEMAN  3,028,126
THREE AXIS CONTROLLER
Filed May 10, 1960  4 Sheets-Sheet 2

INVENTOR.
EUCLID C. HOLLEMAN
BY
ATTORNEYS

April 3, 1962   E. C. HOLLEMAN   3,028,126
THREE AXIS CONTROLLER
Filed May 10, 1960   4 Sheets-Sheet 3

INVENTOR.
EUCLID C. HOLLEMAN
BY
ATTORNEYS

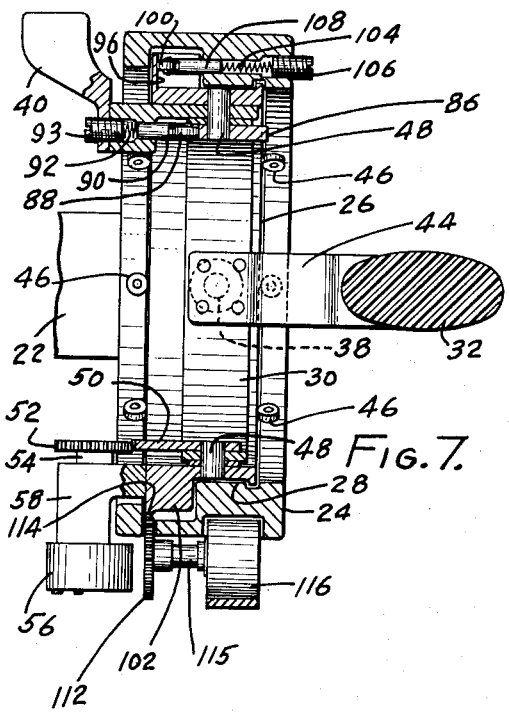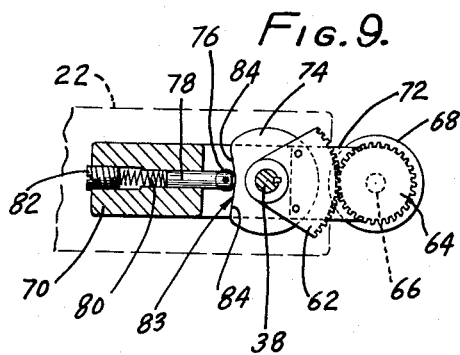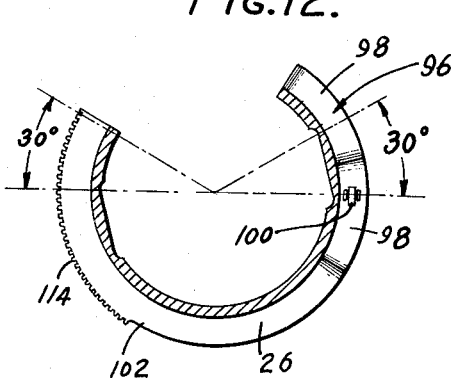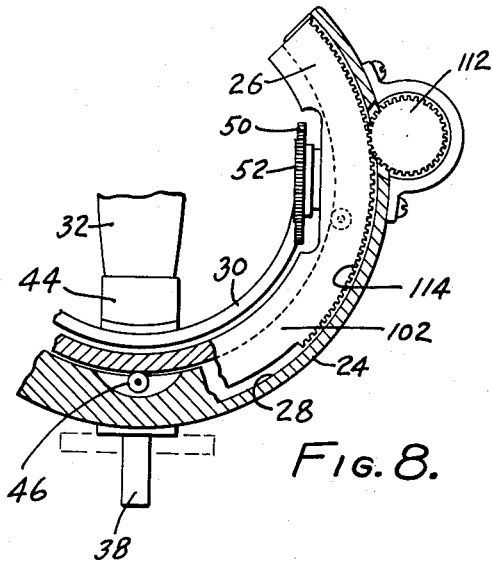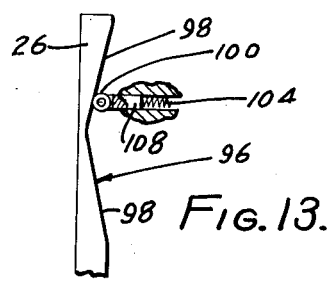

United States Patent Office 3,028,126
Patented Apr. 3, 1962

3,028,126
THREE AXIS CONTROLLER
Euclid C. Holleman, Lancaster, Calif., assignor to the United States of America as represented by the Administrator of the National Aeronautics and Space Administration
Filed May 10, 1960, Ser. No. 28,175
13 Claims. (Cl. 244—83)
(Granted under Title 35, U.S. Code (1952), sec. 266)

The invention described herein may be manufactured and used by or for the Government of the United States of America for governmental purposes without the payment of any royalties thereon or therefor.

This invention relates to control devices, more particularly, it relates to devices for controlling the attitude of a vehicle in flight either within or outside the atmosphere. The invention comprises a three-axis controller, that is, a single control device by which the attitude of a vehicle in flight may be controlled about three orthogonal axes.

In the past, three-axis control of flight vehicles has been achieved by using a two-axis stick for the hand, and pedal controls for the feet. More recently, single unit three-axis controllers have been proposed and constructed. A disadvantage of two-axis stick control devices is the fact that they cannot be used satisfactorily in a high acceleration environment wherein a pilot's movements are highly restricted and control of the flight vehicle must be attained with a minimum of movement on the part of the pilot.

A difficulty of prior three-axis controllers is the fact that proper force characteristics could not be provided without prohibitive size and weight of the controller. The proper force characteristics are necessary to provide the pilot with a sense or "feel" of the position of the vehicle being controlled.

It is therefore an object of this invention to provide a unitary control device for controlling the position of an object in a plurality of planes.

It is another object of this invention to provide a unitary control device for controlling the attitude in three orthogonal planes of a vehicle in flight, either within or outside the atmosphere.

It is still another object of this invention to provide a three-axis controller for flight vehicles, of minimum size and weight which has the proper force characteristics to provide the pilot or operator with a sense of the attitude of the vehicle being controlled.

The above objects are accomplished by a unitary three-axes controller comprising three rings assembled to move one each in the planes of yaw, pitch and roll. Proportional movement of the controlled flight vehicle in planes corresponding to the planes of movement of respective rings is accomplished by making the signals from a potentiometer to an actuator for the control elements of the flight vehicle, proportional to the ring movements. To give the operator a "sense" of the position of the flight vehicle with respect to the vehicle's zero orientation position in any plane, resistance to the movement of each ring away from its null position, which corresponds to the zero planar orientation position of the flight vehicle, is provided such that increase or decrease of the resistance corresponds to movement of the flight vehicle away from or toward its zero orientation position in a particular plane. Resistance to movement of each ring is provided by relative movement between a shaped cam surface attached to the ring, and a cooperating cam follower, the shape of the cam surface and arrangement of the camming elements providing a resistance to movement of the ring as it moves from the zero position.

Figure 15:
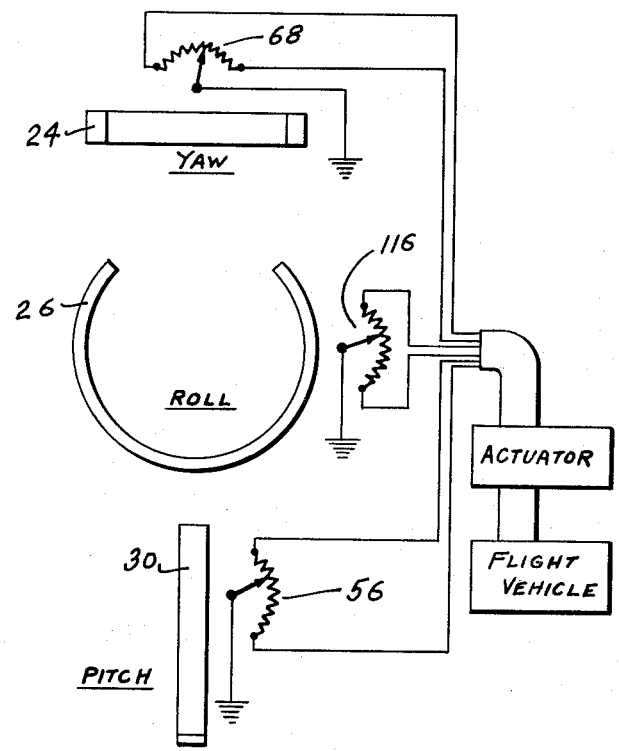
Figure 10:
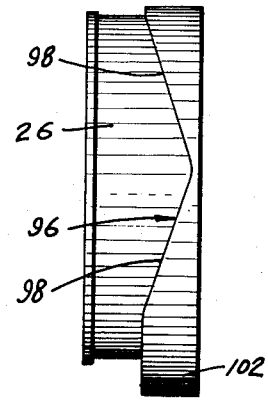
Figure 2:
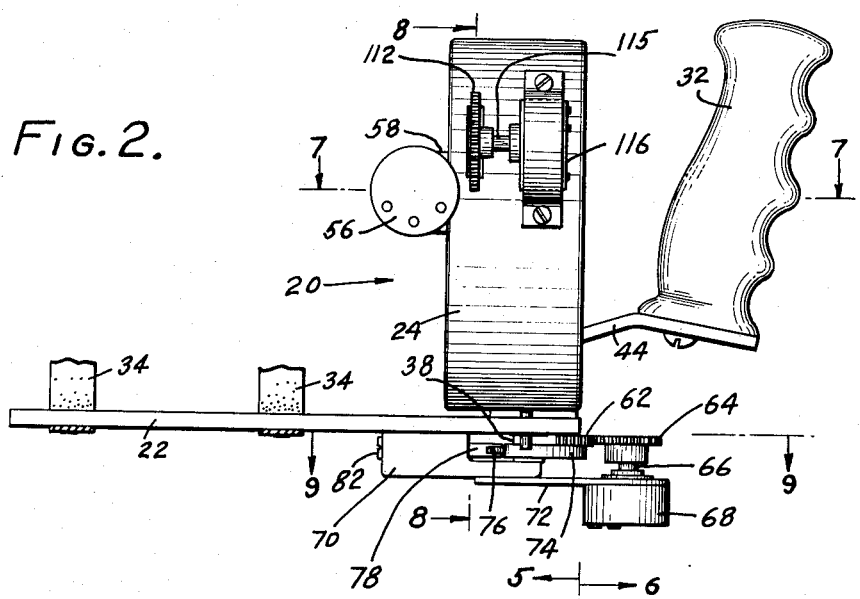
Figure 3:
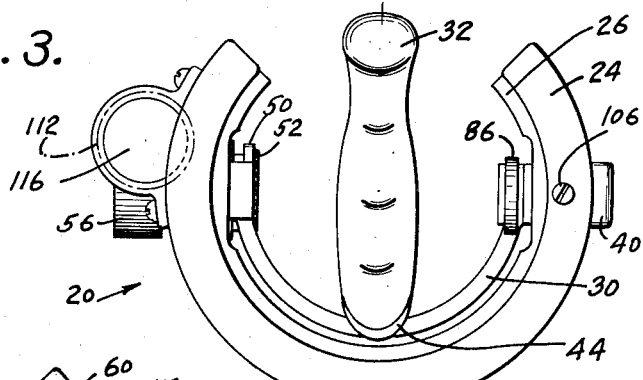
Figure 4:
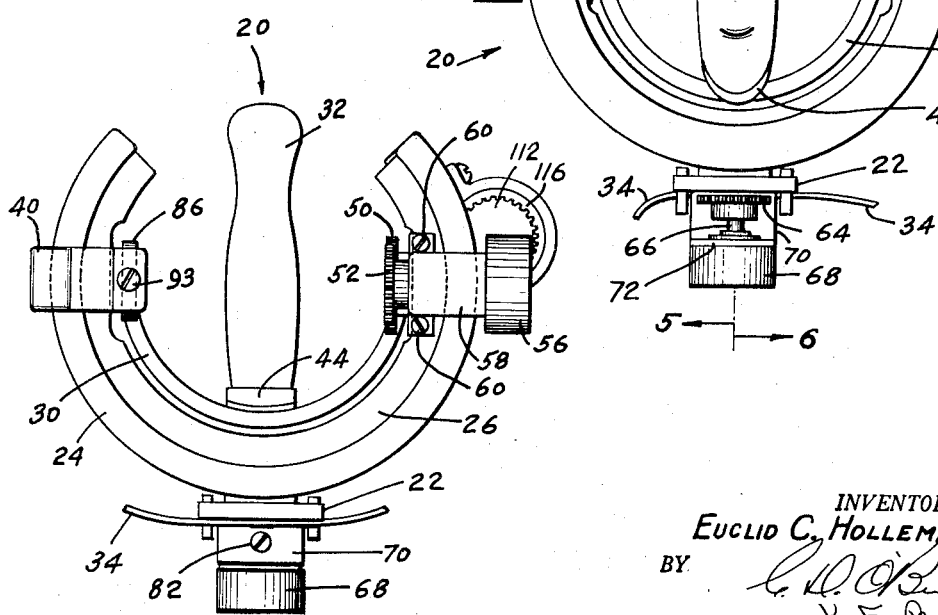
Figure 5:
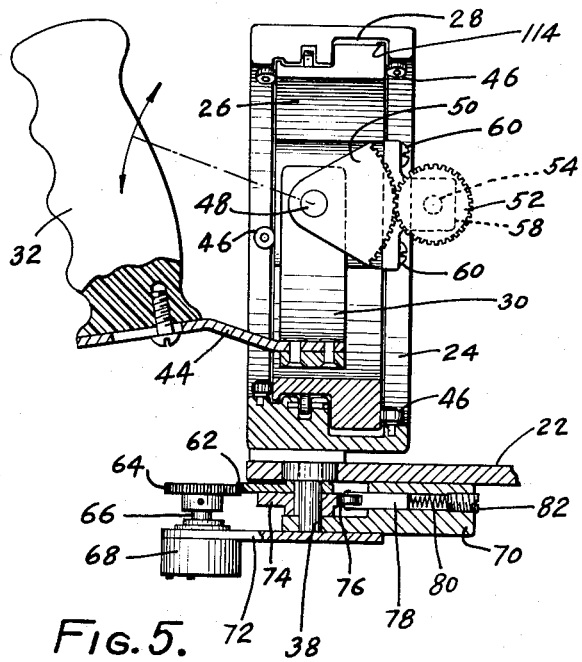
Figure 11:
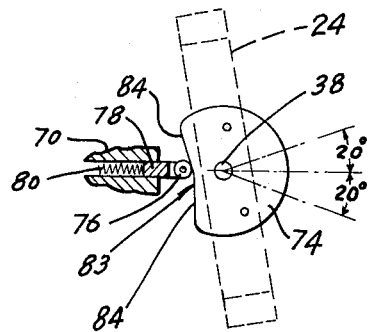
Figure 6:
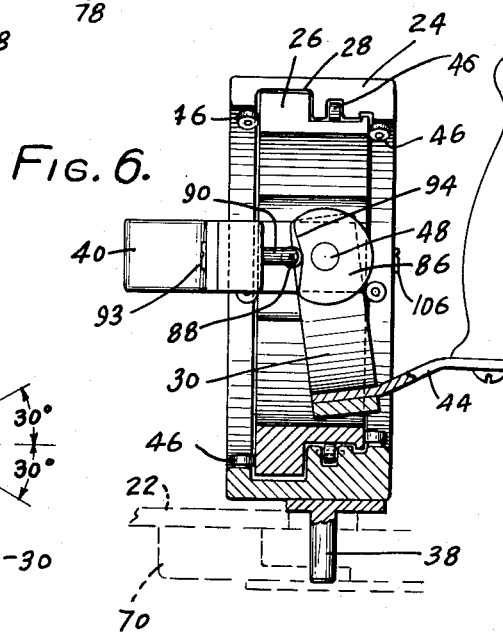
Figure 14:
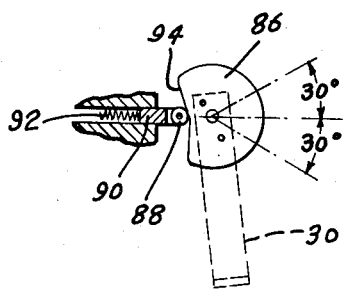

The invention is best understood by reference to the following drawings included as a part of this specification, and in which, FIG. 1 is a perspective view of the apparatus as applied;
FIG. 2 is a side elevational view of the three-axis controller;
FIG. 3 is an end elevational view of the apparatus from the front;
FIG. 4 is an end elevational view of the apparatus from the rear;
FIG. 5 is a vertical cross-section of the apparatus on line 5—5 of FIG. 3;
FIG. 6 is a vertical cross-section of the apparatus on line 6—6 of FIG. 3 showing a view opposed to that of FIG. 5;
FIG. 7 is a partial plan section taken on the line 7—7 of FIG. 2;
FIG. 8 is a partial end elevational view taken on line 8—8 of FIG. 2;
FIG. 9 is a plan section taken on line 9—9 of FIG. 2;
FIG. 10 is a side elevational view of the roll cam;
FIG. 11 is a descriptive view of the yaw cam;
FIG. 12 is an end elevational view of the roll cam;
FIG. 13 is a descriptive view in end elevation of the roll cam;
FIG. 14 is a side elevational view of the pitch cam, and
FIG. 15 is a schematic drawing diagrammatically illustrating the manner in which proportional signals are relayed from the controller to the controlled device.

In the following description like parts are represented by like numerals. Referring now to FIG. 1, the control device itself is shown generally at 20 mounted on support member 22 for operation. Yaw control ring 24 is rotatably mounted on support 22 for rotation along the yaw plane through an angle of 20° on either side of the null position, as shown in FIG. 11. Roll control ring 26 is concentrically mounted in race 28 of yaw control ring 24 for rotation therein around the roll axis, or in the roll plane, through an angle of 30° in either direction, as shown in FIG. 12. Pitch control ring 30 is hingedly mounted near its ends by pivot pin 48, as shown in FIG. 7, on roll control ring 26 for rotatable motion in the pitch plane through an angle of 30° from the horizontal on either side of the hinge point, as shown in FIG. 14. The planes of yaw, roll and pitch are, of course, three mutually perpendicular planes. A grip 32 attached to pitch control ring 30 is provided for moving each of the control rings in its respective plane. The arm rest and hand of a pilot strapped into the controller, if necessary, by means of straps 34 is represented generally at 36. As will be seen from the description which follows, the controller provides control proportional to controller deflection by providing electrical signals to control the flight vehicle proportional to the rotation of the controller grip about the three-axes of operation. The axes of rotation are orthogonal, with the origin at the pilot's wrist pivot so that no arm displacement is required for control. The limits of deflection provided by the angles of rotation of the control rings are designed to be coincident with the natural comfortable limits of hand travel with the arm restrained. The detailed construction of the device will be explained by reference to the additional figures.

The control device is shown at the null position for all three rings in FIG. 2. FIGS. 3 and 4 are opposite end views of the device showing the relationship of the three control rings. As will be seen from FIGS. 2 and 5, yaw control ring 24 is mounted on pivot pin 38 for rotation in the yaw plane. Balance member 40 is attached to pitch control ring 30 by means of screw 93 as shown in FIG. 4. Grip 32 is attached to pitch control ring 30 by means of handle 44 as shown. As shown, particularly in FIGS. 5, 6 and 7, rollers 46 are provided to rotatably support roll control ring 26 in race 28 of yaw control ring 24. Other conventional means such as the use of ball bearings may be used to rotatably support the roll control ring within the race of the yaw control ring. Pitch control ring 30 is mounted on roll control ring 26 by means of rotatable pin 48 as shown in FIG. 7 for rotation in the pitch plane as shown by the arrows.

For producing signals proportional to the movement of pitch control ring 30, a gear train consisting of rack 50 and pinion gear 52 is provided. Rack 50 is attached by welding, or other suitable means, to pitch control ring 30 as shown and its teeth mesh with those of pinion 52 mounted on spindle 54 which is attached for movement of the wiper arm of pitch ring potentiometer 56 shown in FIG. 4. It is apparent from the above construction that movement of the pitch control ring will move the wiper arm of potentiometer 56 through the gear train to proportionately vary its output signal. The gear train assembly is fixedly attached to yaw control ring 24 by means of frame 58 and screws 60 as shown.

For providing electrical signals proportional to the movement of yaw control ring 24, a gear train consisting of rack 62 and pinion 64 is provided as shown in FIGS. 2 and 5. Rack 62 is fixedly attached to pin 38 to rotate with yaw control ring 24 and is geared to pinion 64 which in turn moves spindle 66 which moves the wiper arm of yaw control potentiometer 68. The gear assembly and potentiometer are supported in position by means of housing member 70 and support plate 72 attached to support member 22 as shown. The pivot pin 38 is rotatable within support plate 72 and support member 22, while rack 62 is fixedly attached to pivot pin 38 to rotate with it. The above construction insures that movement of the yaw control ring will correspondingly move the wiper arm of the potentiometer by means of the gear train to proportionately vary the output signal of the potentiometer.

To provide force characteristics for yaw control ring 24, cam 74 with cooperating cam follower 76, as shown in FIGS. 5, 9 and 11, is provided. Cam 74 is fixedly attached to rotate with pivot pin 38 and therefore yaw control ring 24. Cam follower 76 is rotatably supported in camming relationship with the camming surface 84 of cam 74 by means of holder 78, spring 80 and threaded adjustment screw 82.

For providing the proper force characteristics and insuring return of the yaw control ring to the zero point on release, the camming surfaces 84 of cam 74 are constructed as shown in FIG. 9 with sloping type surfaces. The meeting point of the two surfaces corresponds to the null or zero position of the yaw control ring which in turn corresponds to the zero orientation of the controlled vehicle in the yaw plane. In FIG. 11 the arrangement of cam and cam follower is shown corresponding to an off-center position of the yaw element. The force characteristics of the yaw control element can be adjusted by means of threaded adjustment screw 82 through which the pressure of cam follower 76 on the surface 84 can be adjusted. The sloping faces 84 of cam surface 83 result in force characteristics opposing the movement of yaw control ring 24 away from its null point which are non-linear and increase as the distance of the ring from the null point increases.

Referring now to FIGS. 6, 7 and 14, force characteristics for pitch control ring 30 are provided by the camming arrangement of cam 86 and cam follower 88. Cam 86 is fixedly attached to roll control ring by means of a spindle, or otherwise. Cam follower 88 is fixedly supported to move with pitch control ring 30, by means of holder 90, spring 92 and threaded adjustment screw 93. It is to be noted from FIG. 14 that the construction of the camming elements for the pitch control ring is identical with that for the yaw control ring is identical with that for the yaw control ring 24, the sloping surfaces 94 resulting in nonlinearly increasing resistance as the ring, and correspondingly the flight vehicle, is moved away from the null point in the pitch plane. In the case of the camming arrangement for the pitch control ring the cam is stationary and the cam follower moves; the reverse is true for the camming arrangements of the yaw and roll control rings. It is to be understood that the construction of the camming arrangement for each of the control rings is not critical but other cam and cam follower constructions may be used; however, the shaped sloping faces of the camming surface are necessary for obtaining the desired force characteristics of the control rings.

Referring now to FIGS. 7, 8, 10 and 13, the construction for providing force characteristics for the roll control ring and that for providing proportional signals for its movement are described as follows. For giving proper force control characteristics there is provided a camming arrangement consisting of cam surface 96 with sloping cam faces 98, cam follower 100, holder 108 and adjustment screw 106. The camming surface 98 is cut out in the rim 102 of roll control element 26. Proper control force characteristics are obtained by means of spring 104 and threaded adjustment screw 106. The detailed construction of the camming arrangement is shown in FIG. 13 wherein the cam follower is shown in an off-center position which corresponds to an off-zero orientation of the controlled vehicle in the roll plane. Resistance characteristics are obtained with this construction as explained above for similar constructions for the pitch and yaw control rings.

For providing electrical signals proportional to the movement of roll control ring 26, there is provided the arrangement of gear wheel 112 geared to the toothed rim 114 of roll control ring 26 as shown in FIG. 8. Gear wheel 112 is mounted on spindle 115 which moves the wiper arm of the roll potentiometer 116 to provide a potentiometer signal proportional to the movement of the roll control ring.

Referring to FIG. 15, there is shown schematically yaw, roll and pitch potentiometers at 68, 116 and 56, respectively. As shown, the movements of the yaw, roll and pitch control rings are fed into their corresponding potentiometers to produce signals proportional to the ring movements. The modified signals from the potentiometers are fed to the actuator shown in block which in turn moves control elements of simulation devices and other elements such as control surfaces and moveable jet nozzles of flight vehicles. The actuator for translating the proportional electrical signals from the potentiometers into movement of control surfaces of a controlled vehicle is of conventional construction well known in the art.

The operation of the control unit of the invention is as follows. Adjustment screws 82, 93 and 106 for the yaw, pitch and roll rings, respectively, are adjusted to give the proper force or resistance characteristics and the pilot's arm is strapped into position as shown in FIG. 1. Movement of the grip 32 in any of the three orthogonal planes will result in a corresponding movement of the control rings for the respective planes. The output of the signals from the potentiometers corresponding to the respective control rings will be proportional to the deflection of the control rings. The signals, by means of the actuator, will in turn provide proportional adjustment of the control elements, such as control surfaces or rotatable jet nozzles, of the flight vehicle to be controlled. As the zero or null position of each control ring corresponds to zero orientation of the flight vehicle in the respective plane, release of the grip at any point will result in the return of all the control rings to their zero positions because of the camming arrangement previously described, and thus return of the flight vehicle to its zero orientation position. The camming arrangement of sloping camming faces insures the proper force characteristics in each control ring and its immediate return to the zero or null position upon release of the grip.

It is thus seen that there has been provided a three-axis control unit for controlling a flight vehicle about three orthogonal axes which is simple and compact in construction, provides adjustable force characteristics and requires a minimum of movement on the part of the pilot for controlling the attitude of the flight vehicle.

It will be apparent from the above description that many modifications are possible in the light of the above teaching. It is, therefore, to be understood that within the scope of the appended claims the invention may be practiced otherwise than as specifically described herein.

What is claimed is:

1. A three-axis control device for controlling the movement of a vehicle in three orthogonal planes, comprising a first ring member constructed to rotate in a first plane, a second ring member concentrically mounted within said first ring member for rotational about the longitudinal axis of said first ring member in a second plane perpendicular to said first plane and perpendicular to the longitudinal axis of said first ring member, and a third ring member hingedly mounted on the inner surface of said second ring member for rotatable movement in a plane perpendicular to said second plane.

2. The device of claim 1 including means for generating electrical signals proportional to the movements of said ring members.

3. The device of claim 2 including means for providing resistance to the movement of said ring members which increases as the ring members move away from their null positions.

4. The device of claim 3 in which said means for providing resistance includes for each ring member a camming surface and a spring-biased cooperating cam follower arranged to provide relative movement therebetween as the ring member moves, said camming surface comprising two faces meeting at a point corresponding to the null position of the ring member and sloping outwardly therefrom.

5. A three-axis controller for controlling the position of a flight vehicle in three orthogonal planes, comprising, a first ring member constructed to rotate in a first plane, a second ring member concentrically mounted within said first ring member in a race therein for rotation in a second plane perpendicular to said first plane, a third ring member hingedly mounted on the inner surface of said second ring member for rotatable movement in a plane perpendicular to said second plane, a gear train for each ring member in gearing connection therewith, a potentiometer for each ring member having its wiper arm in gearing connection with the gear train of the member, a camming arrangement for each ring member comprising a camming surface and a spring-biased cooperating cam follower arranged to provide relative movement therebetween as the ring member moves, said camming surface comprising two faces meeting at a point corresponding to the null position of the ring member and sloping outwardly therefrom.

6. In combination with a vehicle adapted for control in three orthogonal planes, a unitary control device comprising: a first control element constructed to rotate in a first plane, guide means on said first control element, a second control element mounted concentrically of said first control element constructed to rotate within said guide means in a second plane perpendicular to said first plane, a third control element mounted on said second control element to rotate in a third plane perpendicular to said second plane, means for proportionately translating the movements of said control elements into electrical signals, and means for translating said electrical signals into movement of the control components of the vehicle.

7. The combination of claim 6 in which each of said control elements has a null position in its respective plane of movement corresponding to the null position of the controlled vehicle, and including null positioning means operative for providing resistance to the movement of each control element away from its null position which increases as the distance of the control element away from the null position increases.

8. The combination of claim 7 in which said null positioning means includes for each control element, a camming surface and a spring-biased cooperating cam follower arranged to provide relative movement therebetween as the respective control element moves, said camming surface comprising two faces meeting at a point corresponding to the null position of the control element and sloping outwardly therefrom.

9. In combination with a vehicle adapted for control in three orthogonal planes, a three-axis control device comprising a first ring member constructed to rotate in a first plane, a second ring member concentrically mounted within said first ring member for rotation about the longitudinal axis of said first ring member in a second plane perpendicular to said first plane and perpendicular to the longitudinal axis of said first ring member, and a third ring member hingedly mounted on the inner surface of said second ring member for rotation in a plane perpendicular to said second plane.

10. The device of claim 9 including means for generating electrical signals proportional to the movements of said ring members.

11. The device of claim 9 including null positioning means operative for providing resistance to the movement of said ring members which increases as the ring members move away from their null positions.

12. The device of claim 11 in which said null positioning means includes for each ring member a camming surface and a spring-biased cooperating cam follower arranged to provide relative movement therebetween as the respective ring member moves, said camming surface comprising two faces meeting at a point corresponding to the null position of the ring member and sloping outwardly therefrom.

13. In combination with a vehicle adapted for control in three orthogonal planes, a three-axis controller comprising, a first ring member constructed to rotate in a first plane, a second ring member concentrically mounted within said first ring member in a race therein for rotation in a second plane perpendicular to said first plane, a third ring member hingedly mounted on the inner surface of said second ring member for rotation in a plane perpendicular to said second plane, a gear train for each ring member in gearing connection therewith, a potentiometer for each ring member having its wiper arm in gearing connection with the gear train of the member, a camming arrangement for each ring member comprising a camming surface and a spring-biased cooperating cam follower arranged to provide relative movement therebetween as the ring member moves, said camming surface comprising two faces meeting at a point corresponding to the null position of the ring member and sloping outwardly therefrom, means including said potentiometer for proportionately translating the movements of said control elements into electrical signals, and means for translating said electrical signals into movement of the control components of the vehicle.

References Cited in the file of this patent

UNITED STATES PATENTS

| | | |
|---|---|---|
| 2,470,968 | Aske | May 24, 1949 |
| 2,684,215 | Ashkenas | July 20, 1954 |
| 2,762,123 | Schultz et al. | Sept. 11, 1956 |
| 2,787,746 | Redmond | Apr. 2, 1957 |
| 2,945,648 | Oplinger et al. | July 19, 1960 |

FOREIGN PATENTS

| | | |
|---|---|---|
| 857,592 | France | Apr. 22, 1940 |